United States Patent Office 3,616,735
Patented Nov. 2, 1971

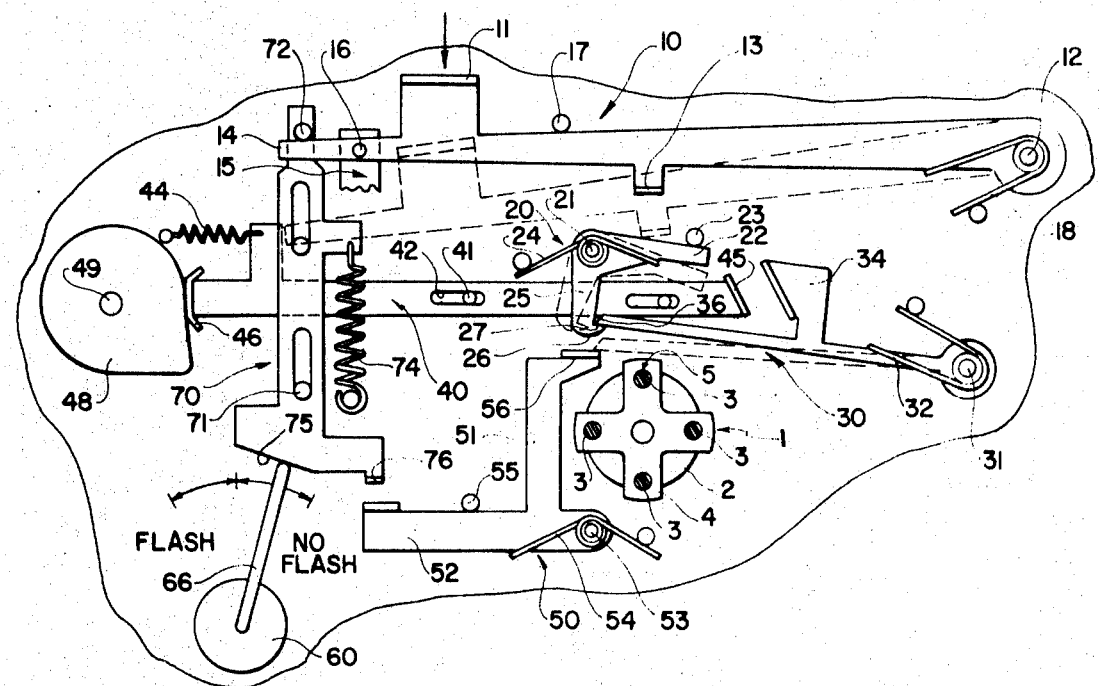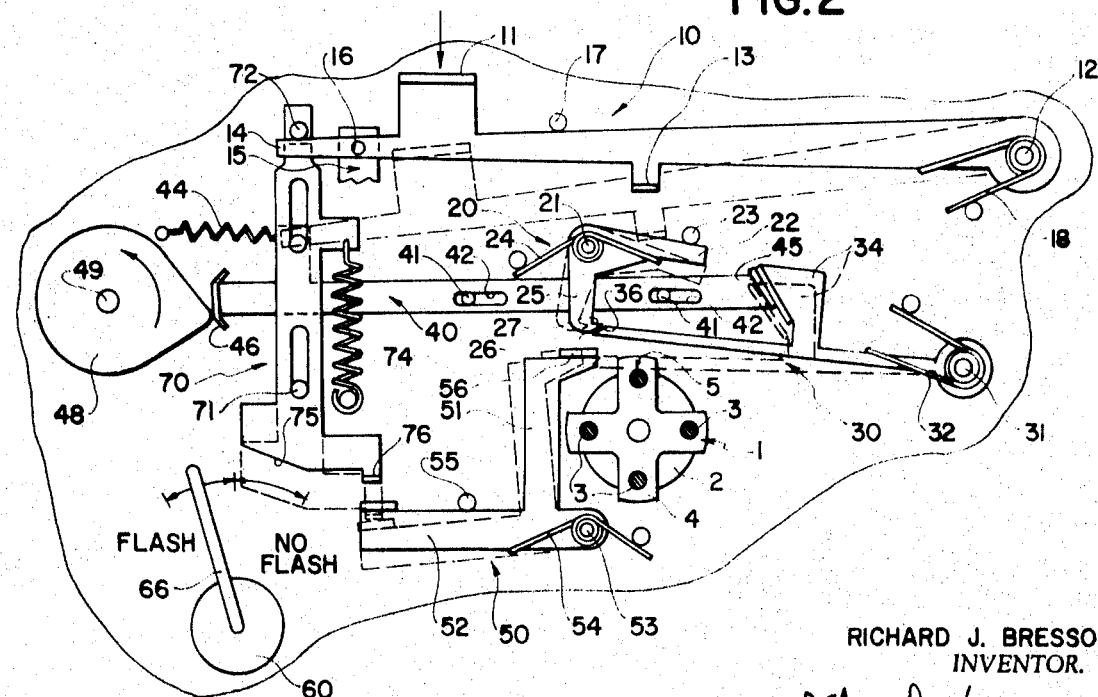

3,616,735
BLOCKING MECHANISM FOR USE WITH PHOTOGRAPHIC APPARATUS TO AUTOMATICALLY CONTROL FLASH IN RESPONSE TO SCENE BRIGHTNESS
Richard J. Bresson, Rochester, N.Y., assignor to Eastman Kodak Company, Rochester, N.Y.
Continuation of application Ser. No. 767,099, Oct. 14, 1968. This application Aug. 12, 1970, Ser. No. 63,250
Int. Cl. G03b 9/70, 15/04
U.S. Cl. 95—11.5
11 Claims

ABSTRACT OF THE DISCLOSURE

A mechanism is provided which automatically controls the position of a blocking member with respect to the path of movement of an actuator for a percussion-ignitable flash lamp or other flash lamp ignitable by striking. The control is responsive to scene light conditions and to the operation of the shutter release lever of a camera.

CROSS-REFERENCES TO RELATED APPLICATIONS

This is a continuation of U.S. application Ser. No. 767,099 filed Oct. 14, 1968. Reference is made to copending U.S. application Ser. No. 765,930, entitled "Multi-lamp Flash Unit," filed Oct. 8, 1968, in the name of David E. Beach; to commonly assigned copending U.S. application Ser. No. 767,140, entitled "Mechanism for Use With Photographic Apparatus To Automatically Control Flash in Response to Scene Brightness," filed Oct. 14, 1968, in the name of Floyd M. Galbraith, Jr.; to copending U.S. application Ser. No. 813,524, entitled "Percussion-Ignitable Flash Unit Having Contact-Actuatable, Pre-Energized Strikers and Photographic Apparatus Using Such Units," filed Apr. 4, 1969, in the names of Joseph V. Poweska and Jeffrey R. Stoneham; and to commonly assigned copending U.S. application Ser. No. 766,739, entitled "Apparatus for Actuating Firing of Percussion-Ignitable Flash Lamps and Operating Mechanism Therefor," filed Oct. 11, 1968, in the name of William T. Hochreiter.

BACKGROUND OF THE INVENTION

Field of the invention

The present invention relates to photographic apparatus and more particularly to an automatic flash control device for use with photographic apparatus having means for actuating firing of percussion-ignitable photoflash lamps or other photoflash lamps ignitable by striking.

Description of the prior art

In the art of photoflash photography it is a desirable feature for photographic apparatus to include means for controlling the flash operation of the apparatus automatically in response to scene brightness. Apparatus having such a feature provide the advantage of allowing the operator to leave a flash lamp inserted in the apparatus and proceed with other picture-taking procedures without attention to or knowledge of the scene light brightness. Such a feature eliminates many errors in picture taking that were caused by the operator's incorrect measuring of scene brightness or forgetting to insert or remove a flash lamp.

The mechanisms which previously have been developed for so controlling flash operation are all designed for use with systems which fire electrically-ignited photoflash lamps and include photoelectric means responsive to scene light for producing an output which opens or closes an electric circuit that fires the flash lamp. One photographic apparatus having such a flash control device is disclosed in U.S. Pat. 3,250,193.

Recently, a percussion-ignitable flash lamp has been developed which can be used in photographic apparatus and precludes the necessity for electric circuits and sources to fire flash lamps. Such percussion-ignitable flash lamps and mounting structure for operably supporting them in photographic apparatus are disclosed in copending U.S. application Ser. No. 765,930, entitled "Multi-lamp Flash Unit" which is further identified above. The lamps in such flash units are ignitable by a percussion impact on a primer which extends from the lamp base. A typical mechanism for firing such lamps includes a striker member which is spring biased towards the lamp primer and released at an appropriate time during the picture-taking sequence to move into percussion-contact with the primer.

Similarly, U.S. Pat. No. 2,972,937, Suits, discloses a flash lamp actuatable by striking of a piezo electric element located in a camera and electrically connectable to the lamp. Such a piezo electric element could be located in a lamp unit with the striker in the camera or also in the unit in a manner similar to the strikers disclosed in the above-mentioned percussive mechanisms.

Of course, an automatic flash control having capabilities such as described above with respect to electrical lamp-firing systems is desirable in photographic apparatus using percussion or piezo electrically ignitable flash lamps. However, it is apparent that the prior art techniques which selectively open and close an electric firing circuit are not applicable in apparatus having a percussion lamp-firing system and are not always convenient in piezo electrical systems.

One mechanism for providing such automatic flash control in apparatus having percussion lamp firing systems is disclosed in copending U.S. application Ser. No. 767,140, entitled "Mechanism for Use With Photographic Apparatus To Automatically Control Flash in Response to Scene Brightness," and includes a means for preventing release of a striker mechanism in response to sensings of scene brightness. This mechanism can be desirably used in conjunction with some percussion-firing systems; however, where the movement of the striker is relied upon in effecting or controlling certain operations in the photographic apparatus besides firing a lamp such as, for example, shutter actuation or film advance, a problem has been found to exist in providing suitable automatic flash control.

SUMMARY OF THE INVENTION

The present invention is addressed to the problems outlined above and provides a mechanism for automatically controlling ignition of a flash lamp in response to scene brightness which flash lamp is actuated by mechanical movement, for example, by striking. This is accomplished by a mechanism which allows at least partial firing movement of the actuating mechanism during actuation of the photographic apparatus but prohibits completion of such firing movement when scene light is above a predetermined level.

It is a further object of the present invention to provide a mechanism responsive to scene brightness for controlling flash operation of an apparatus having a firing system for percussion ignitable and piezo electrically ignitable flash lamps.

It is another object of the present invention to provide a mechanism responsive to scene brightness for blocking a released striking element of a flash lamp firing system before contact with an ignition member responsive to striking.

BRIEF DESCRIPTION OF THE DRAWING

The above and other objects and advantages of the present invention will become apparent to one skilled in the art from the following detailed description read in conjunction with the attached drawing wherein like reference numerals indicate like elements and wherein:

FIG. 1 is a plan view of a fragmentary portion of a photographic apparatus embodying the present invention; and FIG. 2 is a plan view of the portion of apparatus shown in FIG. 1 with elements of the apparatus in positions assumed at a different stage of the cyclic operation of the apparatus.

DESCRIPTION OF PREFERRED EMBODIMENTS

In FIG. 1 is a fragmentary portion of a photographic apparatus, in this instance a camera, embodying the present invention is shown; however, inasmuch as photographic cameras which cooperate with multilamp flash units are generally known, the present description will be directed to elements forming a part of or cooperating more directly with the present invention, elements not specifically shown or described herein being understood to be selectable from those known in the art.

In FIGS. 1 and 2, a lower section of percussion-ignitable multilamp photoflash unit 1 is shown mounted for indexing rotation in a socket 2. Such a photoflash unit and socket are described in detail in copending U.S. application Ser. No. 765,930, entitled "Multilamp Flash Unit" and filed Oct. 8, 1968; however, for purpose of the present description it is sufficient to note that the unit includes pins 3 which extend upwardly from the plane of the drawing as viewed in FIGS. 1 and 2 to individual flash lamps which are not shown.

Although the pins 3 can be either percussive primer elements or piezo electric elements, for convenience, the invention will be described in terms of a percussive system.

The pins 3 are rigidly supported at their bottom end by a base 4 in a manner such that when inserted in socket 2 and indexed to firing locus 5, a pin 3 is disposed in position for percussion striking. Upon striking of a pin 3, a primer charge ignites combustible flash materials enclosed in a transparent envelope to produce the desired photographic illumination. Thereafter the socket 2 is rotated in synchronism with other cyclic camera functions and another primer pin 3 is indexed to firing locus 5, this indexing being effected by apparatus generally known in the art.

Also shown in FIGS. 1 and 2 is a typical camera shutter release lever 10 having an actuating tab 11 which is usually located outside the housing of the camera. The lever 10 is pivotally mounted at one end on pin 12 and urged in a clockwise direction, as viewed in FIGS. 1 and 2, by spring 18. The shutter release lever 10 has formed thereon between tab 11 and pin 12, a striker release lug 13 and includes, near its movable end, a retaining arm 14. Shutter actuating slide 15 is connected to the lever 10 by pin 16 and extends to a location proximate to a suitable shutter actuating mechanism, not shown; and a stop 17 limits clockwise movement of the lever 10.

An L-shaped striker release lever 20 is pivotally mounted on the camera frame by a pin 21 in a location such that a release arm 22 thereof is contactable by release lug 13 of shutter release lever 10 during downward movement of the shutter release lever. The lever 20 is urged in a counterclockwise direction against stop 23 by spring 24. The striker release lever 20 also includes a retaining arm 25 which has a cam surface 26 and retaining ledge 27.

Located in cooperative relation with respect to socket 2 and striker release lever 20 is a percussion striker 30 which is pivotally mounted at one end on a pin 31 and biased in a counterclockwise direction by drive spring 32. The striker 30 also includes a cocking lug 34 extending therefrom and has its moving end 36 shaped to cooperate with cam surface 26 on the striker release lever 20.

Slidingly mounted on the camera frame in operative relation with cocking lug 34 of the striker 30 is a cocking slide 40. The movement of cocking slide 40 is directed by pins 41 which extend through elongated slots 42 in the body of the slide and the slide 40 is urged away from cocking lug 34 by a spring 44. On the end of slide 40 adjacent cocking lug 34 is formed a shoe 45 adapted to contact a mating surface on the lug 34. At the opposite end of lever 40, is formed a follower 46 which is biased into following contact with cocking cam 48 by spring 44. The cam 48 is rotatably mounted on shaft 49 and is rotated in a counterclockwise direction by the cyclic movement of one of the camera elements not shown, such as for example, by the film advancing movement of a film winding lever or the movement of a shutter cocking lever.

Referring again to FIGS. 1 and 2, a blocking member 50 is shown in accordance with the teachings of the present invention. The blocking member in the illustrated embodiment includes a blocking arm 51 and an actuating arm 52 and the blocking member is mounted in the camera at a location proximate socket 2 on a central pivot 53. The blocking member 50 is urged in a clockwise direction about pivot 53 by a spring 54 and is limited by a stop 55 so that in its rest position the blocking arm 51 has a portion 56 located in the path of movement of striker 30 between the striker's energized and firing positions. It can be seen that the blocking arm 52 can be moved out of the path of striker 30 by counterclockwise movement on pivot 53.

A mechanism for controlling the positioning of blocking member 50 includes a typical scene-light measuring instrument, which meter is schematically indicated at 60 and can include a pivoted coil that is energized by or under control of a photocell, not shown. An output member 66 is positioned by the coil of the measuring instrument 60 as a function of scene brightness and moves clockwise as viewed in FIGS. 1 and 2 in response to higher brightness levels.

The control mechanism for blocking member 50 also includes a retracting slide 70 which is mounted in the camera for sliding movement on pins 71, in a position cooperating with shutter release 10, output member 66 and blocking member 50. It can be seen that the retracting slide 70 includes a follower post 72 which is urged downwardly into following contact with retaining arm 14 of shutter release lever 10 by a spring 74 which is weaker than spring 18 of the shutter release mechanism. At the end of slide 70 opposite the follower post 72, is formed a control surface 75 which is adapted to contact outward member 66, when that member is in the zone denoted "no flash needed" in the drawings, and limit downward movement of the slide 70. At the same end as control surface 75, the slide 70 has an extension forming a retracting arm 76; and it can be seen in FIG. 2, that when the output member 66 is not in position to limit downward movement of the slide 70, i.e., in the zone denoted "flash needed" in the drawings, the retracting arm is moved into contact with actuating arm 52 of the blocking mechanism 50 and pivots the blocking mechanism in a counterclockwise direction against the spring 53.

Having now described in detail the various elements shown in FIGS. 1 and 2, the operation of these elements and function of the present invention will be further described.

In FIG. 1 the camera elements are in a stage of cyclic operation ready for picture taking. It can be seen the striker 30 has been cocked and is retained in the cocked position by striker release lever 20. It can also be seen that in FIG. 1, the output member 66 has moved to the zone where no flash is needed in response to a corresponding sensing of scene brightness by light meter 60. When the shutter release 10 is actuated by downward pressure on tab 11, retaining arm 14 moves downwardly to the position indicated by dotted lines in FIG. 1 and the retracting slide 70 is free to move downwardly in response to spring 74.

However, it can be seen that when the output member 66 is in the zone where flash is not required, the member 66 contacts surface 75 of the slide 70 and prevents downward retracting movement of slide 70. The blocking lever 50 is therefore not retracted and portion 56 thereof remains in the striker path. After further downward movement of shutter release lever 10, release lug 13 moves release lever 20 to the position indicated by dotted lines in FIG. 1 and the striker 30 is released and moves to the position likewise indicated. It can be seen that the striker 30 does not contact primer pin 3 and no flash occurs.

Referring now to FIG. 2, the cocking cam 48 is shown during its rotation which causes cocking slide 40 to move the striker 30 back to a cocked position such as shown in FIG. 1. It can be seen that during cocking, end portion 36 of the striker 30 will cooperate with cam surface 26 on the striker release 20 to allow re-engagement of the striker 30. In this instance, the output member 66 has been moved by the light meter in response to scene brightness, to the zone where flash is desired. Therefore, it can be seen that when the shutter release 10 has been actuated to the position indicated by dotted lines in FIG. 2, the retracting slide 70 is free to move under the force of spring 74 into contact with arm 52 of blocking member 50. The blocking member 50 is then therefore pivoted to the position indicated in dotted lines and the portion 56 is moved out of the path of striker 30 so that upon subsequent release the striker is free to move into percussion contact with pin 3 as also indicated in dotted lines.

It will be appreciated by one skilled in the art that the control mechanism of the present invention can be used in conjunction with other types of firing systems for mechanically-ignitable flash lamps insofar as such systems embody a flash actuating element which moves along an actuating path into which a blocking element can be interjected.

For example, in copending U.S. application Ser. No. 813,524 entitled "Percussion-Ignitable Flash Unit Having Contact-Actuatable, Pre-Energized Strikers and Photographic Apparatus Using Such Units," which is further identified above, a flash unit is disclosed in which preloaded firing spring is provided within the flash unit. Flash units of this type utilize an actuating element in a camera or other photographic apparatus, which element is moved along an actuating path and into the flash unit to release the firing spring in the flash unit. The firing spring in turn, fires the percussive primer of a flash lamp in the unit. The blocking element of the control mechanism of the present invention can be located to move into the path of the camera actuating element of such a system thereby controlling flash in the same manner as described herein. Also, in copending U.S. application Ser. No. 766,739, entitled "Apparatus for Actuating Firing Percussion-Ignitable Flash Lamps and Operating Mechanism Therefor," further identified above, a mechanism is disclosed for adapting a horizontal striking movement such as of striker 30 to actuate release of the preloaded spring in a percussive flash unit. It will be apparent to one skilled in the art that by employing an adapting mechanism the embodiment of the present invention disclosed herein also can be used to provide controlled actuation of such preloaded percussion-ignitable flash units.

It will also be appreciated by those skilled in the art that the invention can be applied to other flash systems in which ignition is initiated by striking, for example, to piezo electric systems. In such systems a piezo electric element is placed at the firing locus 5 and connected electrically to a flash lamp. When struck, the piezo element generates sufficient voltage to fire the lamp. The piezo element can be located permanently in the camera or can be built into each lamp unit.

Thus, in accordance with the present invention, a flash is selectively produced in response to ordinary movements of the photographic apparatus and the output from a scene-light sensor, and a partial movement of the flash actuating mechanism provided during each picture-taking cycle.

It will, of course, be appreciated by those skilled in the art that the disclosed embodiment of the present invention can be modified so that the blocking member is normally biased out of the firing path of the striker and moved into the path by movement of a mechanism similar to retractor 70 but designed to move the blocking element into the path. In such a modification the light output would disable the mechanism which moved the blocking element into the firing path when in a position indicating flash was needed.

It will also be appreciated that the blocking member 56 can be used to couple a camera aperture setting to the distance setting and provide automatic exposure control for flash in a manner similar to that disclosed in U.S. Patent No. 3,175,479.

The invention has been described in detail with particular reference to preferred embodiments thereof, but it will be undesrtood that variations and modifications can be effected within the spirit and scope of the invention.

I claim:

1. In a photographic camera having means for supporting a photoflash lamp ignitable by striking, a striker movable along a firing path to initiate firing of said lamp, and means for sensing and producing an output indicative of scene-light conditions, the improvement comprising:
   (a) blocking means movable between a position in the firing path of said striker and a position out of the firing path of said striker; and
   (b) means responsive to the output of said scene-light sensing means for controlling the positioning of said blocking means.

2. The invention defined in claim 1 wherein said blocking means is located in said position in the firing path of said striker in response to a sensing of scene light conditions above a predetermined level.

3. The invention defined in claim 1 wherein said blocking means is located in said position out of the firing path of said striker in response to a sensing of scene light conditions at and below a predetermined level.

4. In photographic apparatus of the type adapted to receive percussion-ignitable photoflash lamps, the combination comprising:
   (a) firing means movable along a firing path into percussion contact with a received lamp;
   (b) means for sensing scene light conditions; and
   (c) means for blocking said firing means from an inserted lamp in response to predetermined sensings of said sensing means.

5. The invention defined in claim 4 wherein said blocking means comprises a movable blocking member that is resiliently urged into a blocking position in said firing path and control means responsive to predetermined sensings of said light sensing means for removing said blocking member from said firing path during movement of said firing means.

6. The invention defined in claim 5 wherein said apparatus includes a shutter release member and said control means comprises:
   (a) an output member coupled to said light sensing means and movable thereby in response to a change in scene light conditions;
   (b) retracting means actuated by said shutter release for moving said blocking member from said firing path during actuation of said shutter release when said output member is in a position indicating flash operation.

7. The invention defined in claim 6 wherein said output member disables said retracting means when in a position indicating non-flash operation.

8. The invention defined in claim 6 further comprising a striker release and wherein said shutter release actuates said striker release after actuation of said retracting means.

9. In a photographic camera having means for supporting a percussion-ignitable photoflash lamp, a member movable along an actuating path to actuate firing of an inserted lamp and means for sensing, and producing an output indicative of, scene-light conditions, the improvement comprising:
- (a) blocking means movable between a position in the actuating path of said member and a position out of the actuating path of said member; and
- (b) means, responsive to said output of said scene-light sensing means, for controlling the positioning of said blocking means.

10. The invention defined in claim 9 wherein said blocking means is located in said position in the actuating path of said member in response to a sensing of scene light conditions above a predetermined level.

11. In photographic apparatus of the type adapted to receive percussion-ignitable photoflash lamps, the combination comprising:
- (a) means movable along an actuating path for actuating firing of a received lamp;
- (b) means for sensing scene light conditions; and
- (c) means, operatively associated with said scene light sensing means, for blocking said actuating means from an inserted lamp in response to predetermined sensings of said sensing means.

References Cited

UNITED STATES PATENTS

| | | | |
|---|---|---|---|
| 590,204 | 9/1897 | Blackmore | 95—11.5 |
| 3,528,353 | 9/1970 | Colville | 95—11.5 |

SAMUEL S. MATTHEWS, Primary Examiner

M. L. GELLNER, Assistant Examiner